(12) United States Patent
Wang

(10) Patent No.: US 7,830,316 B2
(45) Date of Patent: Nov. 9, 2010

(54) FOLDABLE ELECTRONIC DEVICE WITH ANTENNA

(75) Inventor: Chen-Sheng Wang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 191 days.

(21) Appl. No.: 12/183,051

(22) Filed: Jul. 30, 2008

(65) Prior Publication Data

US 2009/0033571 A1 Feb. 5, 2009

(30) Foreign Application Priority Data

Aug. 2, 2007 (TW) .............................. 96128410 A

(51) Int. Cl.
*H01Q 1/24* (2006.01)
*H01Q 1/10* (2006.01)
(52) U.S. Cl. ...................... 343/702; 343/901
(58) Field of Classification Search ................ 343/702, 343/872, 900, 901
See application file for complete search history.

(56) References Cited

U.S. PATENT DOCUMENTS

| 5,448,251 | A | | 9/1995 | Gerszberg et al. | |
|---|---|---|---|---|---|
| 5,684,672 | A | * | 11/1997 | Karidis et al. | 361/679.26 |
| 5,828,341 | A | * | 10/1998 | Delamater | 343/702 |
| 6,031,497 | A | * | 2/2000 | Nam | 343/702 |
| 6,239,754 | B1 | | 5/2001 | Kim | |
| 2004/0140937 | A1 | | 7/2004 | Yang | |

\* cited by examiner

*Primary Examiner*—Shih-Chao Chen
(74) *Attorney, Agent, or Firm*—Jianq Chyun IP Office

(57) ABSTRACT

A foldable electronic device with an antenna including a first body, a second body, a pivotal mechanism, an antenna and a driving element is provided. The first body has a holding recess on one side thereof. The second body is located on the other side of the first body. The pivotal mechanism is used to pivotally connect the first body to the second body. Two sides of the driving element are connected to the pivotal mechanism and the antenna, respectively. When the first body is opened relatively to the second body, the pivotal mechanism drives the driving element to generate a first linear displacement. The first linear displacement drives the antenna to have a second rotation displacement to allow the antenna to extend out of the receiving groove.

7 Claims, 6 Drawing Sheets

FOLDABLE ELECTRONIC DEVICE WITH ANTENNA

CROSS-REFERENCE TO RELATED APPLICATION

This application claims the priority benefit of Taiwan application serial no. 96128410, filed on Aug. 2, 2007. The entirety of the above-mentioned patent application is hereby incorporated by reference herein and made a part of specification.

BACKGROUND OF THE INVENTION

1. Field of the Invention

The invention relates to a foldable electronic device and, more particularly, to a foldable electronic device with an antenna.

2. Description of the Related Art

With the rapid development of the science and technology, many electronic devices bring convenience to the people and become essential in their daily lives. For example, many people carry notebook computers and utilizes network to communicate with others or obtain needed information. The wireless network becomes popular gradually, and therefore, users may utilize wireless network to access the Internet besides network cable.

To provide preferred signal quality for users, an antenna is often disposed in a notebook computer and used to receive signals transmitted from the wireless network access point. Generally-speaking, the casing of a conventional notebook computer is made of metal such as aluminum magnesium alloy to obtain enough strength. However, the shielding effect of the metal affects reception of the antenna. Therefore, for the casing of a conventional notebook computer, besides the metal, the plastic is also used. One portion of the casing, which corresponds to the antenna, is made of the plastic. Thus, the reception of the antenna is not affected.

In this way, when the casing is produced, the cost of producing and assembling the plastic part is additionally added. In addition, the metal is different from the plastic in the tactile sensation, and then the appearance is affected. Furthermore, when the casing is designed, the aesthetics of whole casing should be considered, and the plastic part needs additional adornment and beautification.

BRIEF SUMMARY OF THE INVENTION

The invention provides a foldable electronic device with an antenna, and an antenna extends automatically to receive signals when the foldable electronic device with an antenna is opened.

The invention provides a foldable electronic device with an antenna including a first body, a second body, a pivotal mechanism, an antenna and a driving element. The first body has a holding recess at one side. The pivotal mechanism is used to pivotally connect the first body to the second body, and it includes a first pivot and a second pivot. The first pivot is connected to the first body. The second pivot is connected to the second body and is located at the other side of the body opposite to the holding recess. The first pivot is pivoted the second pivot to allow the first body to rotate relatively to the second body. The antenna is pivotally disposed in the holding recess of the first body. One end of the driving element is fixed to the first pivot, and the other end is fixed at one end of the antenna. When the first body is opened relatively to the second body, the first pivot generates a first rotation displacement relatively to the second pivot. The first rotation displacement allows the driving element to generate a first linear displacement toward the first pivot, and the first linear displacement allows the antenna to generate a second rotation displacement thus to allow the antenna to extend out of the holding recess.

In one embodiment of the invention, the foldable electronic device with an antenna further may includes a restoring element disposed between the antenna and the first body to allow the antenna to be located in the holding recess. The restoring element may be a torsion spring.

In one embodiment of the invention, the driving element may be a metal wire.

In one embodiment of the invention, the first body may be a display for displaying the result of processing the electronic data. In addition, the second body is a host for processing the electronic data, and the antenna may be electrically connected to the host.

The invention further provides a foldable electronic device with an antenna including a first body, a second body, a pivotal mechanism, an antenna and a driving element. The first body has a holding recess at one side. The pivotal mechanism is used to pivotally connect the first body to the second body, and it includes a first pivot and a second pivot. The first pivot is connected to the first body. The second pivot is connected to the second body and is located at the other side of the first body opposite to the holding recess. The second pivot is pivoted the first pivot to allow the first body to rotate relatively to the second body. The antenna is pivotally disposed in the holding recess of the first body. One end of the driving element is fixed to the first pivot, and the other end is fixed at one end of the antenna. When the first body is opened relatively to the second body, the first pivot generates a first rotation displacement relatively to the second pivot. The first rotation displacement allows the driving element to generate a first linear displacement toward the first pivot, and the first linear displacement allows the antenna to generate a second rotation displacement thus to allow the antenna to extend out of the holding recess.

In one embodiment of the invention, the foldable electronic device with an antenna further may includes a restoring element disposed between the antenna and the first body to allow the antenna to be located in the holding recess. The restoring element may be a torsion spring.

In one embodiment of the invention, the driving element may be a metal wire.

In one embodiment of the invention, the first body may be a display for displaying the result of processing the electronic data. In addition, the second body is a host for processing the electronic data, and the antenna may be electrically connected to the host.

The foldable electronic device with an antenna utilizes the pivotal mechanism to drive the driving element when it rotates to allow the driving element to drive the antenna to extend out of the first body. Therefore, the antenna is not affected by the shielding effect of the metal casing, and the plastic part does not need to be additionally disposed on the metal casing. The antenna has a preferred reception, and the casing has a low cost and a beautiful appearance. In addition, via the driving of the pivotal mechanism and the driving element, the antenna may extend outside the first body automatically, and via the resilience of the restoring element, the antenna may retracts to the first body automatically. Thus, the antenna is used conveniently.

These and other features, aspects, and advantages of the present invention will become better understood with regard to the following description, appended claims, and accompanying drawings.

DETAILED DESCRIPTION OF THE EMBODIMENTS

In the following embodiments, the foldable electronic device with an antenna is, for example, a notebook computer. The second body is a host of the notebook computer and is used to process electronic data. The first body is a display for displaying results of processing the electronic data. When the first body is opened relatively to the second body, the antenna is driven by the driving element to extend out of the first body automatically to enhance the reception, of the antenna.

First Embodiment

Figure 1A:
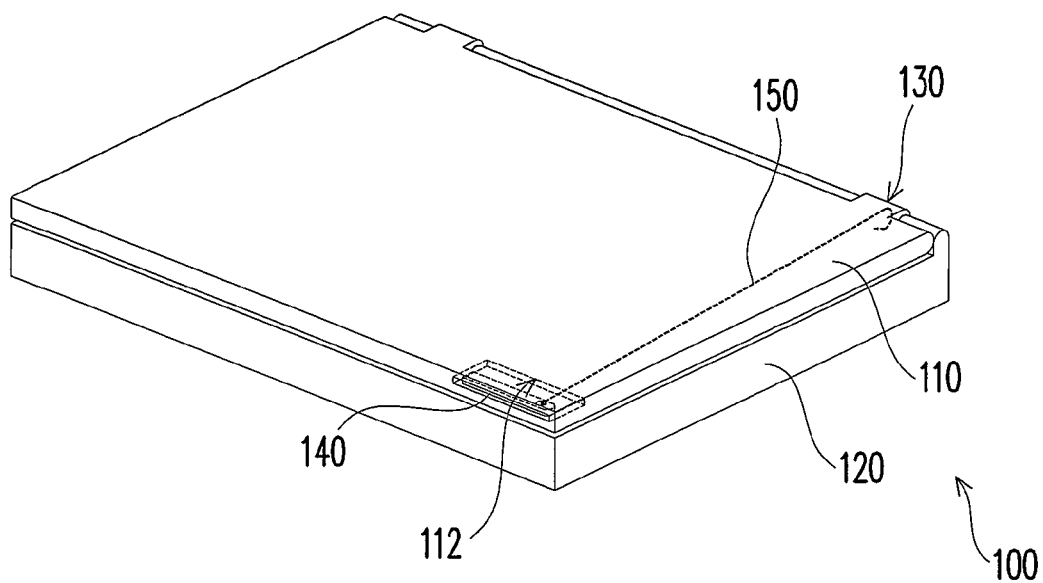
FIG. 1A is three dimensional perspective diagram showing a foldable electronic device with an antenna in a closed state according to the first embodiment of the invention.
Figure 1B:
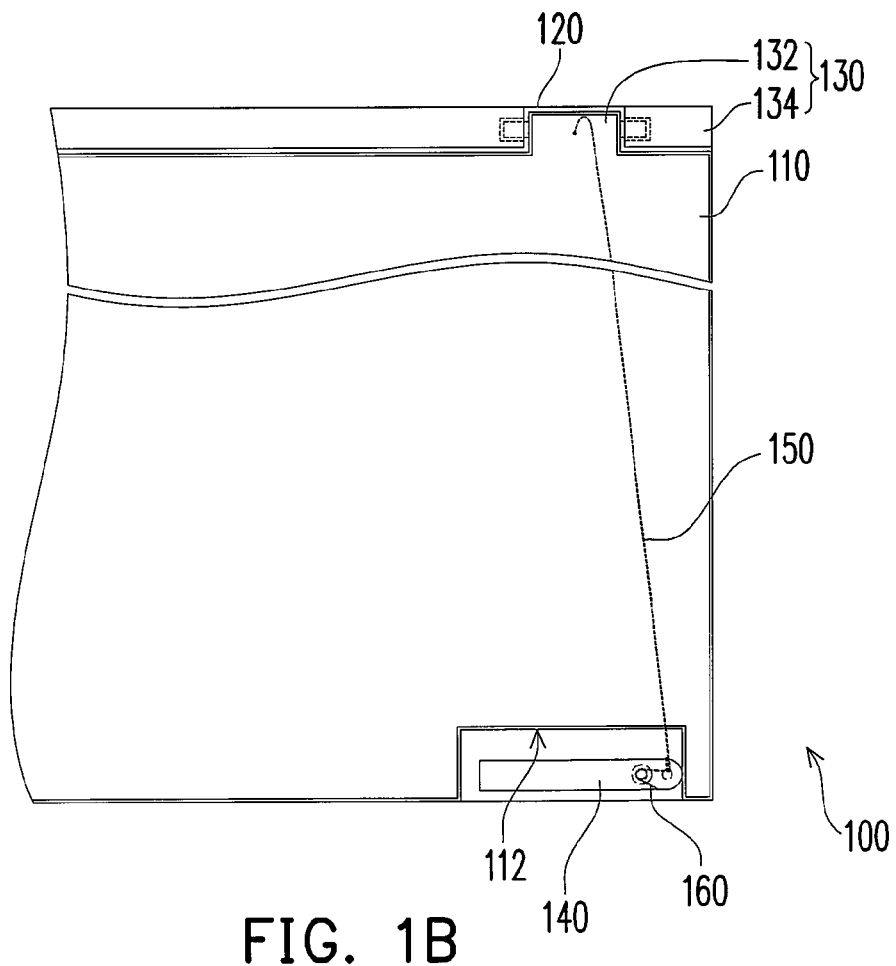
FIG. 1B is a top perspective diagram showing the foldable electronic device with an antenna shown in FIG. 1A.
Figure 2A:
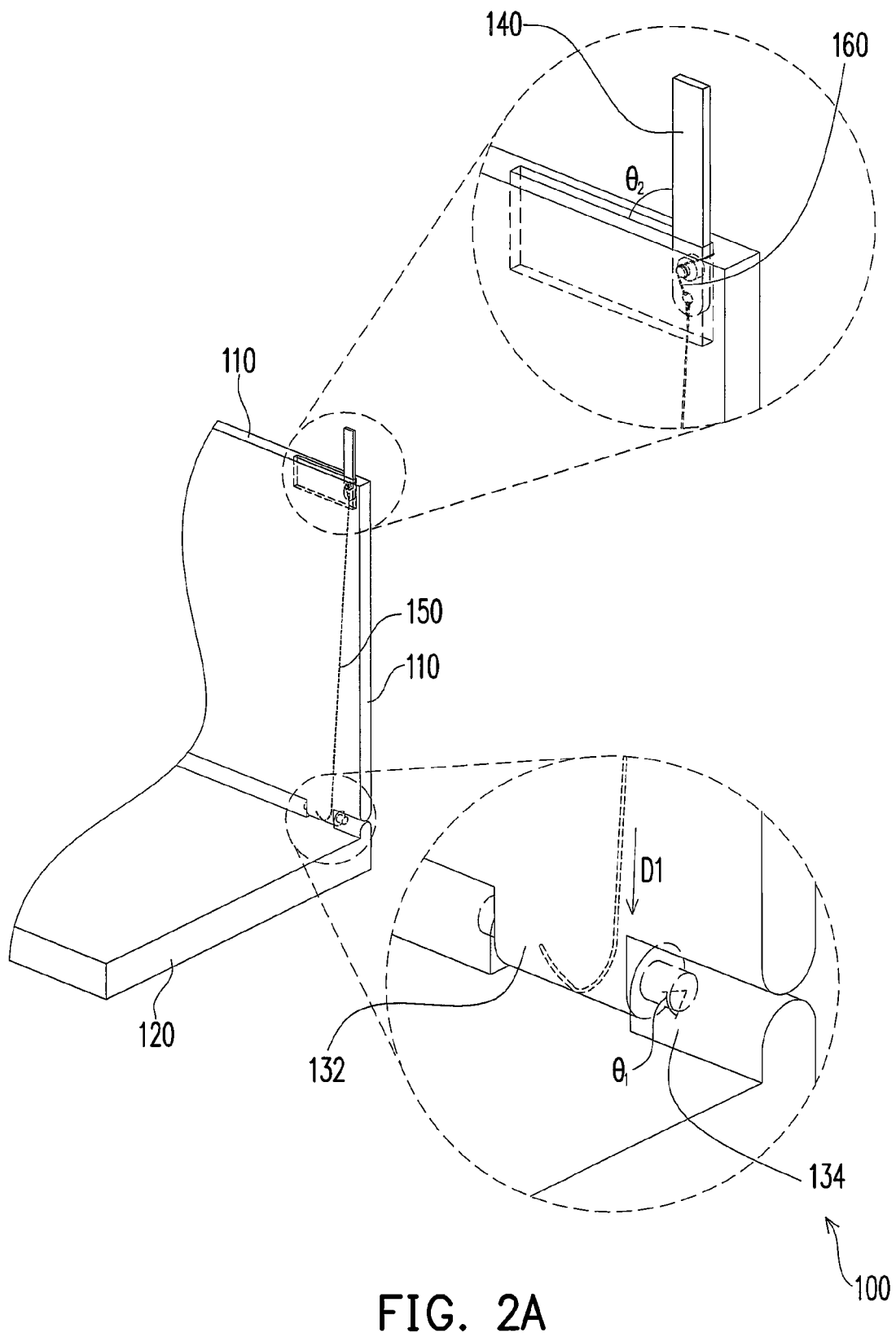
FIG. 2A is a three dimensional perspective diagram showing the foldable electronic device with an antenna shown in FIG. 1A in an open state.
Figure 2B:
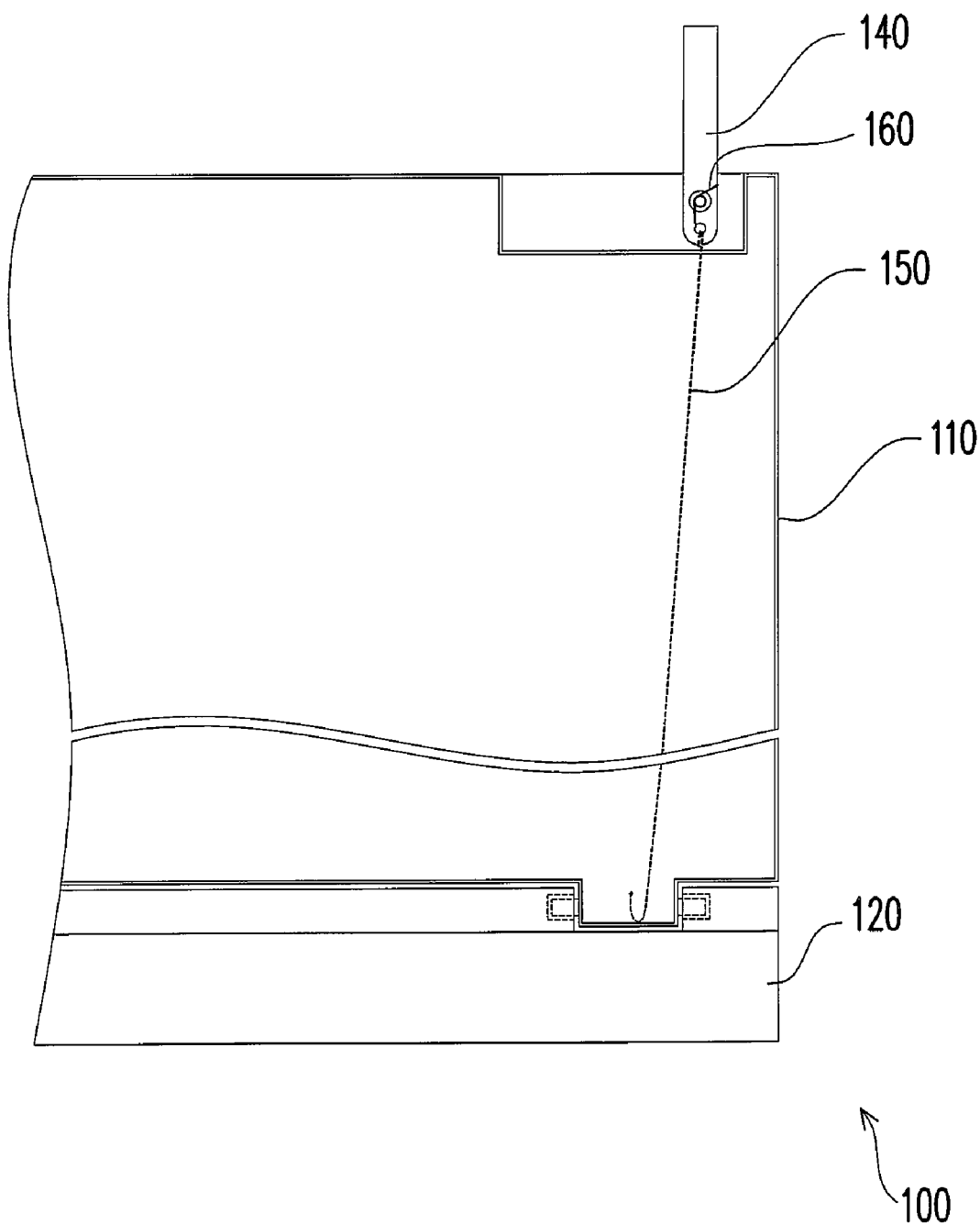
FIG. 2B is a lateral perspective diagram showing the foldable electronic device with an antenna shown in FIG. 2A.

FIG. 1A is a three dimensional perspective diagram showing a foldable electronic device with an antenna in a closed state according to the first embodiment of the invention. FIG. 1B is a top perspective diagram showing the foldable electronic device with an antenna shown in FIG. 1A. FIG. 2A is a three dimensional perspective diagram showing the foldable electronic device with an antenna in an open state, and FIG. 2B is a lateral perspective diagram showing the foldable electronic device with an antenna shown in FIG. 2A. As shown in FIG. 1A, FIG. 1B, FIG. 2A and FIG. 2B, the foldable electronic device with an antenna 100 of the embodiment mainly includes a first body 110, a second body 120, a pivotal mechanism 130, an antenna 140 and a driving element 150. The elements included by the foldable electronic device with an antenna 100 and the connection relationships thereof are described with the drawings.

The first body 110 has a holding recess 112 at one side. In the embodiment, the holding recess 112 is located at the top of the first body 110. The second body 120 is pivotally connected to the bottom of the first body 110. In the embodiment, the casings of the first body 110 and the second body 120 may be made of metal such as aluminum magnesium alloy.

The pivotal mechanism 130 is used to pivotally connect the first body 110 to the second body 120. In detail, the pivotal mechanism 130 includes a first pivot 132 and a second pivot 134. The first pivot 132 for example: a rotation shaft is connected to the first body 110. Furthermore, the first pivot 132 may be integrally formed with the first body 110. The second pivot 134 for example: a bearing is connected to the second body 120 and is located at the other side of the first body 110 opposite to the holding recess 112. Similarly, the second pivot 134 may be integrally formed with the second body 120. The first pivot 132 is pivoted the second pivot 134 to allow the first body 110 to be opened relatively to the second body 120.

The antenna 140 is pivotally disposed in the holding recess 112 of the first body 110 and is electrically connected to the host. The antenna 140 may be located at a first position in the holding recess 112 (as shown in FIG. 1A and FIG. 1B), and it also may be located at a second position where it is partially exposed from the first body 110 (as shown in FIG. 2A and FIG. 2B). One end of the driving element 150 is fixed at the first pivot 132, and the other end is fixed at one end of the antenna 140. In the embodiment, the driving element 150 may be a metal wire. Furthermore, as shown in FIG. 2A, one end of the driving element 150 is fixed to the antenna 140, and the other end is fixed to the first pivot 132 by winding around the first pivot 132 from the back side of the first pivot 132 to the front side of the first pivot 132.

As shown in FIG. 1A and FIG. 1B, when the foldable electronic device 100 is closed, the antenna 140 is held in the holding recess 112. Then, as shown in FIG. 2A and FIG. 2B, when the first body 110 is opened relatively to the second body 120, the first pivot 132 generates a first rotation displacement $\theta_1$ relatively to the second pivot 134. The first rotation displacement $\theta_1$ allows the driving element 150 to generate a first linear displacement $D_1$ toward the first pivot 132. The first linear displacement $D_1$ allows the antenna 140 to generate a second rotation displacement $\theta_2$. Thus, the antenna 140 automatically extends to the second position shown in FIG. 2A from the first position in the holding recess 112 shown in FIG. 1A to receive electronic signals.

Furthermore, as shown in FIG. 1B, the foldable electronic device with an antenna 100 further includes a restoring element 160. The restoring element 160 is disposed between the antenna 140 and the first body 110, and it has a resilience to allow the antenna 140 to be held in the holding recess 112. Thus, when the foldable electronic device 100 is closed, the antenna 140 may be automatically held in the holding recess 112, and users do not need to manually restore the antenna 140. In the embodiment, the restoring element 160 may be a torsion spring.

Second Embodiment

Figure 3A:
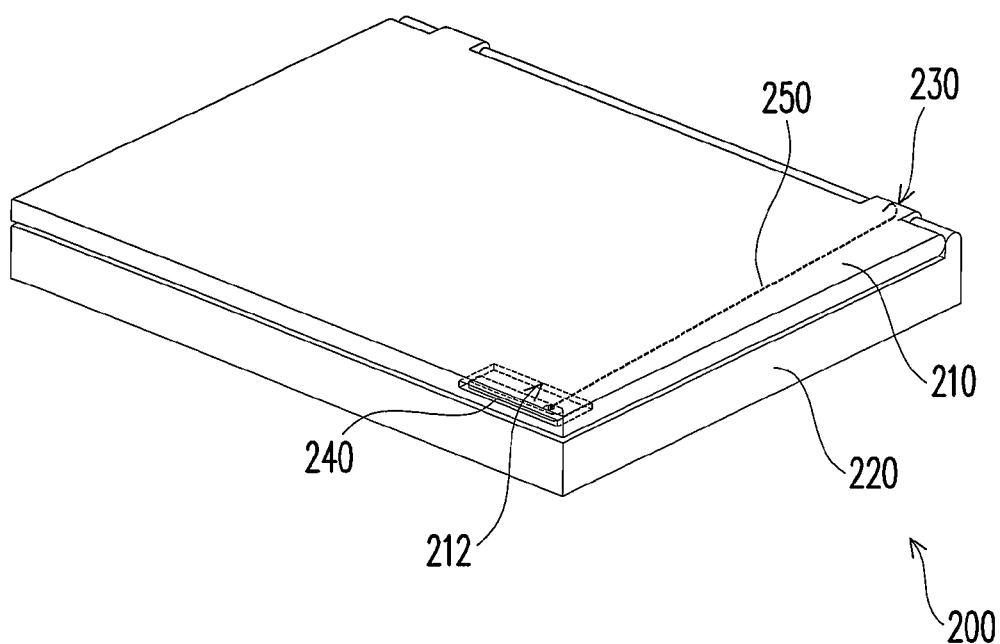
FIG. 3A is a three dimensional perspective diagram showing a foldable electronic device with an antenna in a closed state according to the second embodiment of the invention.
Figure 3B:
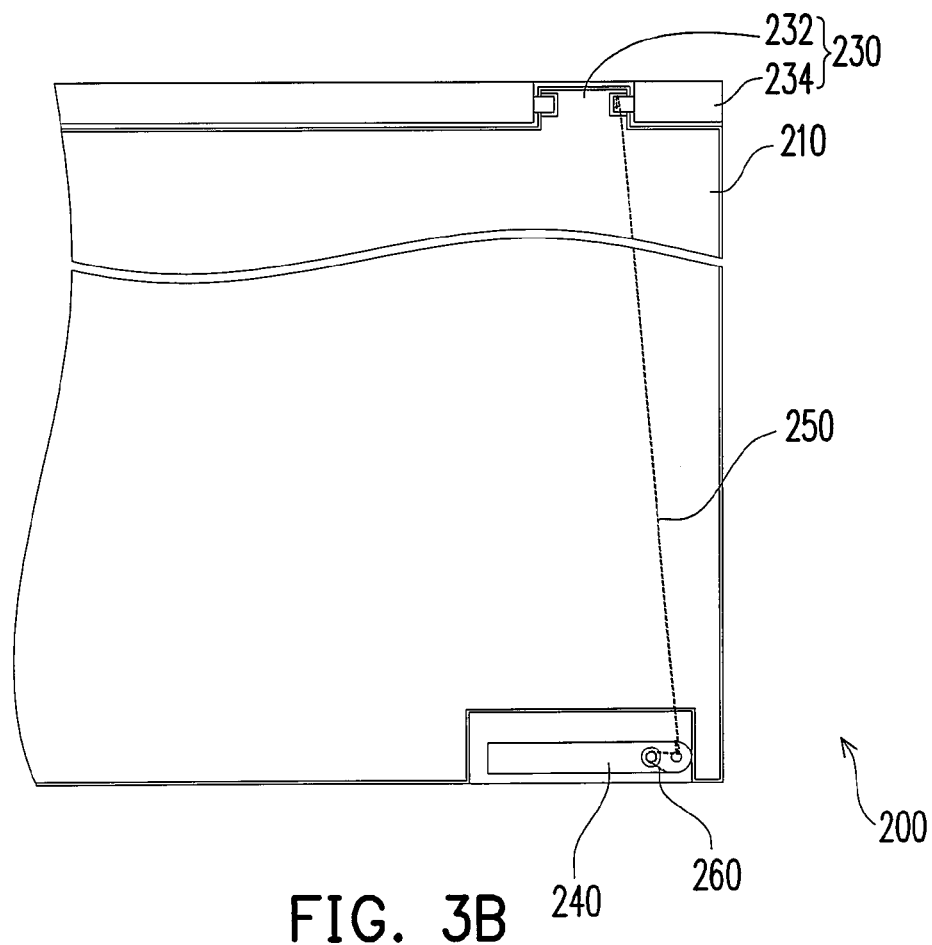
FIG. 3B is a top perspective diagram showing the foldable electronic device with an antenna shown in FIG. 3A.

FIG. 3A is a three dimensional perspective diagram showing a foldable electronic device with an antenna in a closed state according to the second embodiment of the invention, and FIG. 3B is a top perspective diagram showing the foldable electronic device with an antenna shown in FIG. 3A. As shown in FIG. 3A and FIG. 3B, the foldable electronic device with an antenna 200 includes a first body 210, a second body 220, a pivotal mechanism 230, an antenna 240 and a driving element 250. The second embodiment is similar to the first embodiment, and the similar part is described in the first embodiment and is not described herein for concise purpose.

The difference between the second embodiment and the first embodiment is described hereinbelow. In the first embodiment, one end of the driving element 150 is fixed at the first pivot 132, and the other end is fixed at one end of the antenna 140. In this embodiment, one end of the driving element 250 is fixed at the second pivot 234, and the other end is fixed at one end of the antenna 240. Furthermore, as shown in FIG. 3A and FIG. 3B, one end of the driving element 250 is fixed at the antenna 240, and the other end is fixed to the second pivot 234 by winding around the second pivot 234 from the front side of the second pivot 234 to the back side of the second pivot 234.

Figure 4A:
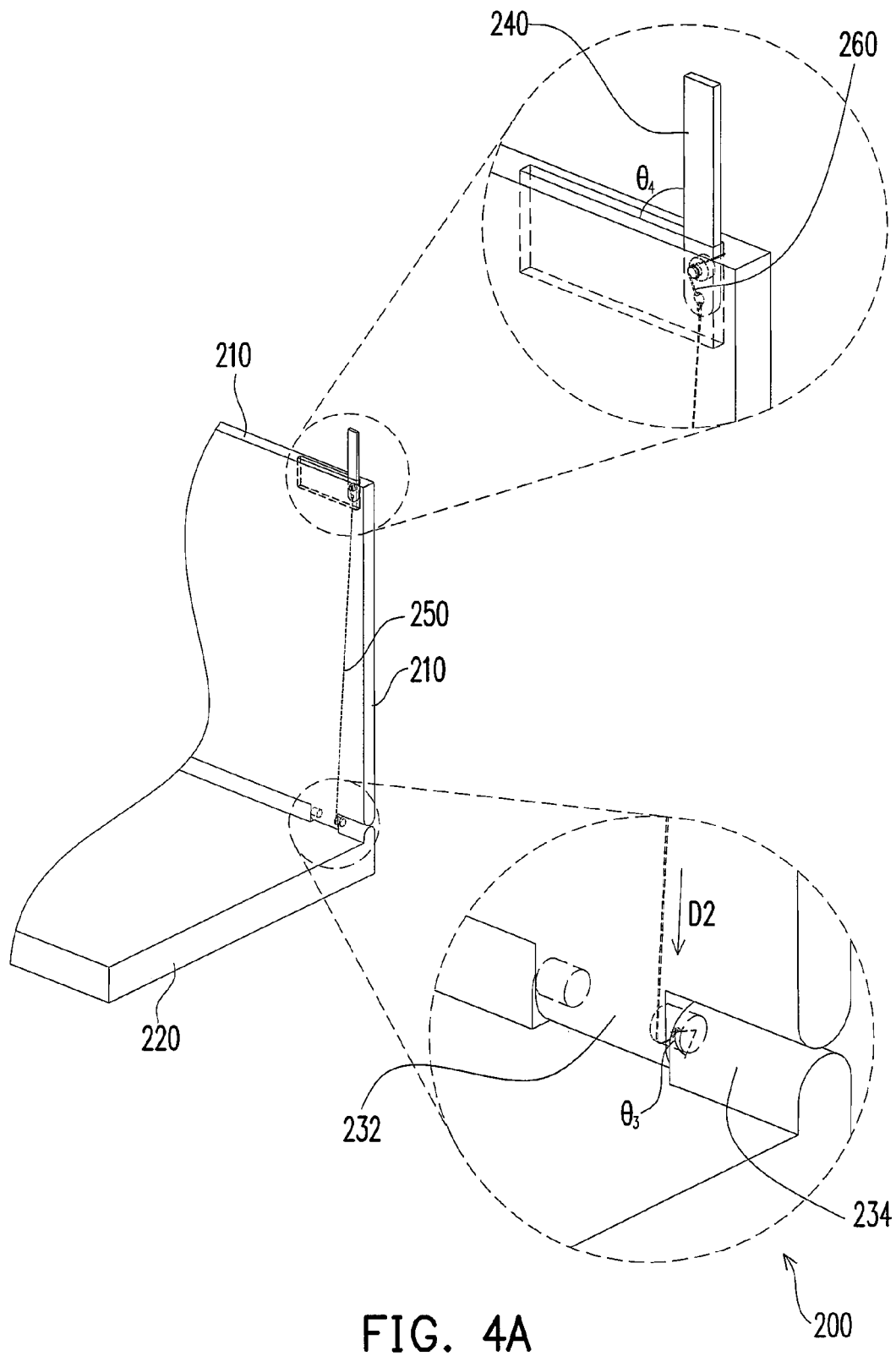
FIG. 4A is a three dimensional perspective diagram showing the foldable electronic device with an antenna shown in FIG. 3A.
Figure 4B:
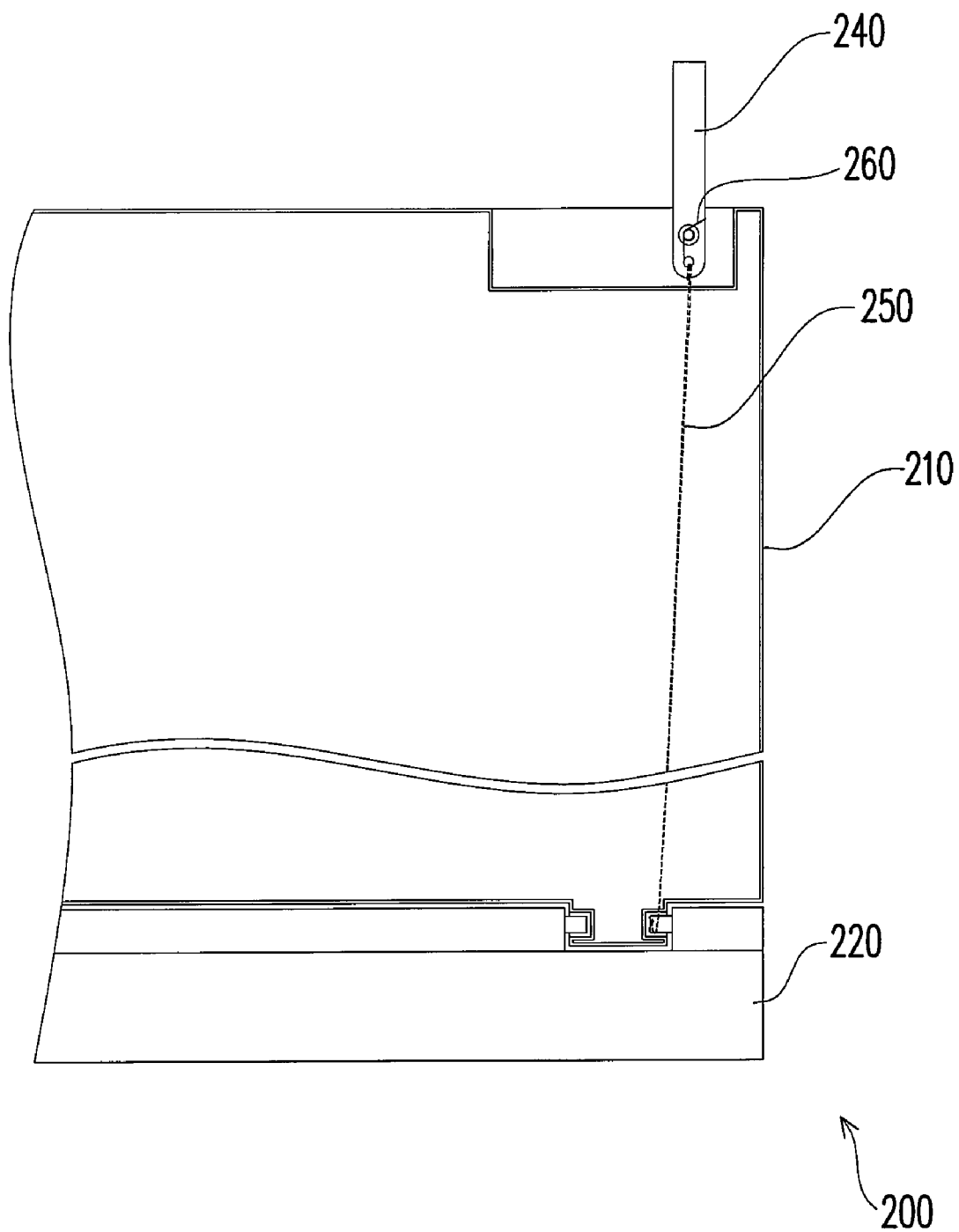
FIG. 4B is a lateral perspective diagram showing the foldable electronic device with an antenna shown in FIG. 4A.

As shown in FIG. 3A and FIG. 3B, when the foldable electronic device 200 is closed, the antenna 240 is held in the holding recess 212. FIG. 4A is a three dimensional perspective diagram showing the foldable electronic device with an antenna shown in FIG. 3A. FIG. 4B is a lateral perspective diagram showing the foldable electronic device with an antenna shown in FIG. 4A. As shown in FIG. 4A and FIG. 4B, when the first body 210 is opened relatively to the second body 220, the first pivot 232 generates a first rotation displacement $\theta_3$ relatively to the second pivot 234. The first rotation displacement $\theta_3$ allows the driving element 250 to generate a first linear displacement $D_2$ toward the first pivot 232. The first linear displacement $D_2$ allows the antenna 140 to generates a second rotation displacement $\theta_4$. Thus, the antenna 240 extends to the second position in FIG. 4A from the first position in the holding recess 212 shown in FIG. 3A automatically to receive the electronic signals.

Furthermore, as shown in FIG. 3B, the foldable electronic device with an antenna 200 also includes a restoring element 260. When the foldable electronic device 200 is closed, via the resilience of the restoring element 260, the antenna 240 may be held in the holding recess 212 automatically, and a user does not need to restore the antenna 240 manually.

To sum up, the foldable electronic device with an antenna of the invention utilizes the pivotal mechanism to drive the driving element when it rotates to allow the driving element to drive the antenna to extend out of the first body. The invention has the following advantages.

First, since the antenna may extend out of the first body, the antenna is not affected by the shielding effect of the metal casing, and it has a good reception.

Second, since the plastic part dose not need to be disposed additionally on the metal casing, the cost is low and the appearance is esthetical.

Third, when the first body is opened from the second body, via the driving of the pivotal mechanism and the driving element, the antenna may automatically extend out of the first body. When the first body is closed to the second body, via the resilience of the restoring element, the antenna may automatically retract to the first body. Thus, the usage is convenient.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A foldable electronic device with an antenna, comprising:
    a first body having a holding recess at one side;
    a second body;
    a pivotal mechanism for pivotally connecting the first body to the second body, the pivotal mechanism comprising:
        a first pivot connected to the first body; and
        a second pivot connected to the second body and located at the other side of the first body opposite to the holding recess, wherein the first pivot is pivoted the second pivot to allow the first body to rotate relatively to the second body;
    an antenna pivotally disposed in the holding recess of the first body; and
    a driving element, wherein one end of the driving element is fixed to the second pivot, and the other end is fixed to one end of the antenna;
    wherein when the first body is opened relatively to the second body, the first pivot generates a first rotation displacement relatively to the second pivot, the first rotation displacement allows the driving element to generate a first linear displacement toward the first pivot, and the first linear displacement allows the antenna to generate a second rotation displacement to allow the antenna to extend out of the holding recess.

2. The foldable electronic device with an antenna according to claim 1, further comprising a restoring element disposed between the antenna and the first body to allow the antenna to be located in the holding recess when the foldable electronic device closed.

3. The foldable electronic device with an antenna according to claim 2, wherein the restoring element is a torsion spring.

4. The foldable electronic device with an antenna according to claim 1, wherein the driving element is a metal wire.

5. The foldable electronic device with an antenna according to claim 1, wherein the first body is a display for displaying the result of processing electronic data.

6. The foldable electronic device with an antenna according to claim 5, wherein the second body is a host for processing the electronic data.

7. The foldable electronic device with an antenna according to claim 6, wherein the antenna is electrically connected to the host.

* * * * *